UNITED STATES PATENT OFFICE.

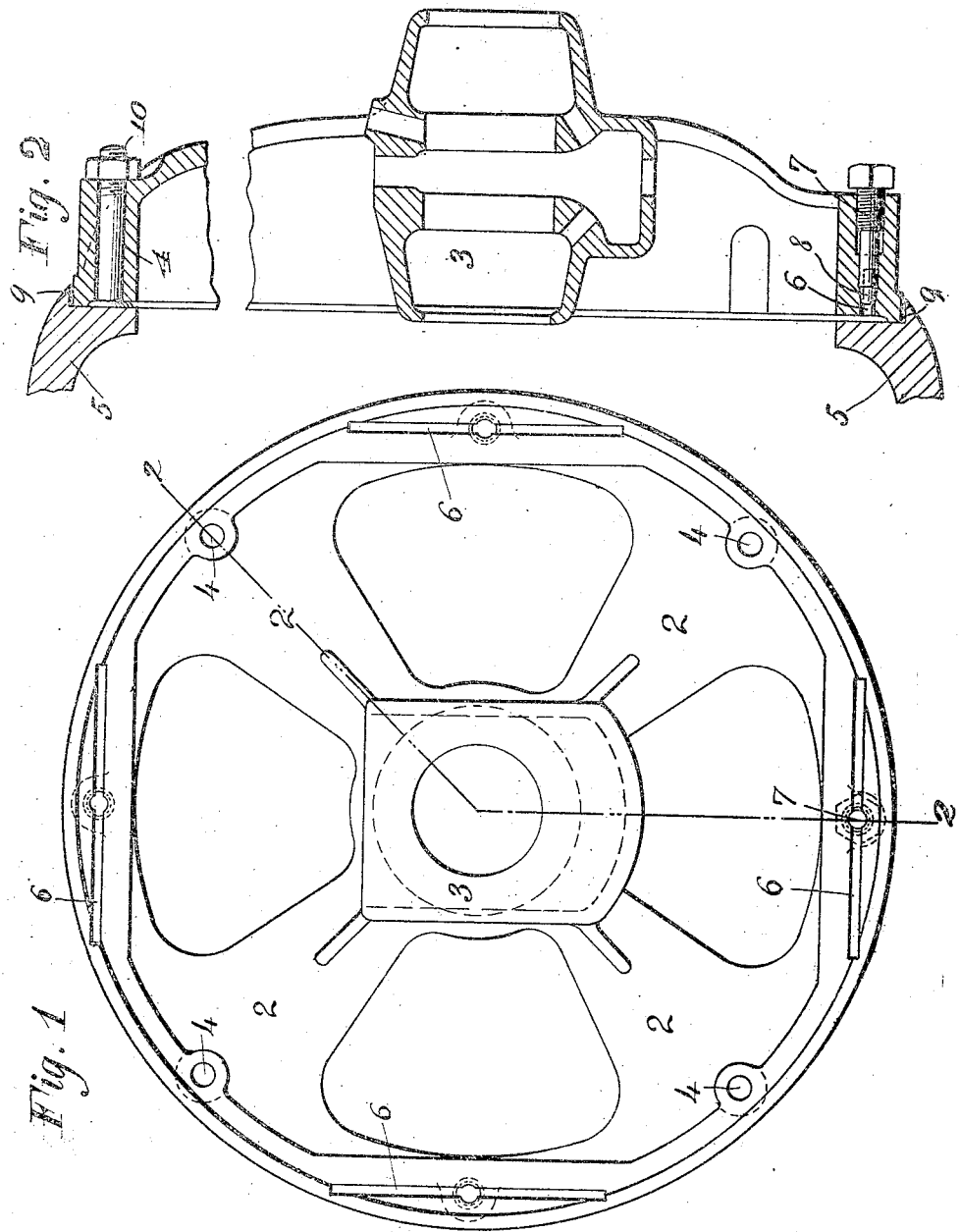

CLARENCE CORBIN MITCHELL, OF MADISONVILLE, OHIO, ASSIGNOR TO THE TRIUMPH ELECTRIC COMPANY, A CORPORATION OF OHIO.

DYNAMO-ELECTRIC MACHINE.

1,033,188. Specification of Letters Patent. Patented July 23, 1912.

Application filed November 7, 1911. Serial No. 658,980.

*To all whom it may concern:*

Be it known that I, CLARENCE CORBIN MITCHELL, a citizen of the United States, residing at Madisonville, in the county of Hamilton and State of Ohio, have invented certain new and useful Improvements in Dynamo-Electric Machines, of which the following is a full, clear, and exact specification:

This invention relates to brackets for supporting the rotatable elements of electric generators or motors.

The object is to provide means for accurately centering the rotary element. The air gap between the field poles or stator and the armature or rotor of such machines is made as small as is consistent with a good mechanical operation to decrease as much as possible the reluctance of the magnetic circuit and produce a maximum torque or current. With machines of induction type, particularly such as induction motors, the air gap is very small and it is important to provide for and maintain a true central relation of the rotor with respect to the stator. This centering is ordinarily determined by drilling a group of symmetrical holes in the end-cap or bracket in which the rotor-shaft is journaled and sliding the bracket in place over stud-bolts similarly spaced in the end walls of the stator frame or yoke. As an eccentricity of the rotor with respect to the stator of one one-thousandth of an inch materially affects the performance of the motor, it is desirable to provide a more perfect means of centering than that ordinarily employed. My invention permits the end to be attained with a great degree of accuracy.

In carrying out the invention I provide the central bracket at a plurality of points adjacent to the rim with elongated slots extending in a line coincident with a chord of an arc and employ tapering adjusting screws mounted in the walls of the bracket to expand the slots. The bracket is supported over a plurality of stud-bolts mounted on the end of the stator frame and enters a circular recess machined in said frame to approximately center it. After being assembled adjustment of one or more of the screws expands its slot and shifts the rotor in a desired direction to accurately center it in the magnetic field of the stator, rendering the width of the air-gap perfectly uniform throughout. The slots are formed near the periphery of the centering bracket which permits its walls to spring slightly so as to shift the rotor in the desired direction in the stator yoke.

My invention therefore consists of a supporting bracket and means for adjusting its axial center on its supporting studs into true central alinement with the center of the stator field.

It consists also of other more specific features which will be hereinafter fully described in the specification and definitely indicated in the claims.

In the accompanying drawings which illustrate the invention Figure 1 is a rear elevation of a supporting bracket embodying my improvements. Fig. 2 is a sectional view along radii on the line 2—2 of Fig. 1. Fig. 3 is a side elevation of a portion of the bracket on a plane at right-angles to that of Fig. 1.

Referring now to the drawings in detail, Fig. 1 represents a bracket embodying my improvements formed as a casting with a plurality of radial arms 2 and a central hub 3 to receive a bearing for the rotor shaft. Near the rim of the bracket are drilled a plurality of holes 4 symmetrically related and adapted to slip with suitable clearance over similarly spaced stud-bolts 10 on the circular end of the stator 5. I have shown four of these holes, although, of course, a greater or lesser number might be employed. I preferably place between each pair of these holes a slot 6 milled in the casing and of a length subtending an arc near the periphery, the slots extending close to the edge of the bracket, as indicated in the drawing. The walls of the bracket are thickened at the center of the slots so as to form bosses which may be tapped to receive adjusting screws 7. The end of these screws as indicated at 8 tapers and the walls of the slot are widened at the central point (see Fig. 1) to admit the tapering end.

In assembling the parts a bracket such as is described is placed at each end of the stator frame with the rotor or armature in position and the brackets are slid over the stud bolts at the ends of the stator, and pushed snugly into position, thereby seating with some clearance, the machined periphery 9 of the bracket in the coöperating recess on the end of the stator. One or more of the screws 7 are then adjusted in the slots 6 so as to bring the rotor truly central within the stator field, by expanding the slot and shifting the bracket in the desired direction to produce a concentric relation. The adjustment required is very slight, and the springing of the outer wall of the slot forces the periphery 9 against the wall of the recess in the stator frame 5 as an abutment thereby shifting the body of the bracket in the opposite direction. If overadjustment is produced the diametrically opposite screw will permit compensation in one diametrical line, and adjustment of the slots on the diametrical line at right-angles will permit a true center to be obtained. After definitely finding the center, the bracket is screwed tight on the rotor frame by lock-nuts engaging the stud bolts passing through the holes 4. It will be evident that if the rotor gets out of center at any time, the eccentricity may be easily corrected by suitable adjustment of one or more of the screws 7.

The invention, while of especial use in electric generators or motors, is of general advantage and may be used on any type of rotary machines on which small clearances exist and where accurate centering is necessary.

Having thus described my invention what I claim as new and desire to secure by Letters Patent is:

1. Means for centering the revolving element of a rotary machine comprising a frame, a bracket secured to said frame and adapted to support said element, said bracket having a rim capable of being expanded, and means for expanding the rim at a plurality of peripheral points to shift the rotary element into true centrality.

2. Means for centering a rotary element comprising a bracket adapted to support said element and having a plurality of slots near its rim, and adjusting screws for expanding the slots.

3. Means for centering a rotary element comprising a circular bracket adapted to support said element, a coöperating fixed element, said bracket being symmetrically seated against a part of the coöperating fixed element and having a plurality of slots near its rim, and tapering screws for expanding the slots.

4. Means for accurately centering a rotary element within its coöperating stationary element comprising a stationary element, a supporting bracket seated in a circular recess of the stationary element and having a plurality of slots near its rim, and adjusting screws for expanding the slots.

5. Means for centering a rotary element within a stationary element comprising a stationary element, a circular bracket mounted on studs on the end of the stationary element and having a plurality of slots near its rim, adjusting screws to expand the slots, and an abutment on the stationary element to engage the outer slot walls.

6. Means for centering a motor armature comprising the field magnet frame, an end bracket mounted in a circular recess in the field magnet frame, said bracket having a plurality of slots near its rim, and tapering adjusting screws on the bracket to expand the slots.

7. In a dynamo-electric machine, inclosing means consisting of a stator frame with faced ends and faced end shields provided with bearings for the rotor, one of the inclosing parts having rigidly attached elastic centering portions engaging the other part, means for springing the centering portions, and means for clamping together the parts of the inclosing means, substantially as described.

8. In a dynamo-electric machine, a stator frame with faced ends, faced end shields provided with bearings for the rotor and elastic centering portions rigidly attached thereto and engaging the stator frame, means for springing the centering portions and means for clamping the end shields to the stator frame, substantially as described.

9. In a dynamo-electric machine, a stator frame with faced ends, faced end shields provided with bearings for the rotor and elastic centering portions rigidly attached thereto and having outwardly facing bearing points in engagement with the interior of the stator frame, means for springing the centering portions, and means for clamping the end shields to the stator frame, substantially as described.

In testimony whereof I affix my signature, in presence of two witnesses.

CLARENCE CORBIN MITCHELL.

Witnesses:
W. BUCHANAN,
JOSEPH P. WHITE.